United States Patent
Saarikko et al.

(10) Patent No.: US 8,432,363 B2
(45) Date of Patent: Apr. 30, 2013

(54) OPTICAL ACTUATORS IN KEYPADS

(75) Inventors: Pasi Saarikko, Espoo (FI); Pauli Laitinen, Helsinki (FI); Juha Pietarinen, Pirkkala (FI)

(73) Assignee: Nokia Corporation, Espoo (FI)

( * ) Notice: Subject to any disclaimer, the term of this patent is extended or adjusted under 35 U.S.C. 154(b) by 575 days.

(21) Appl. No.: 12/527,331

(22) PCT Filed: Feb. 23, 2007

(86) PCT No.: PCT/IB2007/000445
§ 371 (c)(1),
(2), (4) Date: Aug. 3, 2010

(87) PCT Pub. No.: WO2008/102196
PCT Pub. Date: Aug. 28, 2008

(65) Prior Publication Data
US 2010/0295792 A1    Nov. 25, 2010

(51) Int. Cl.
*G09G 5/00* (2006.01)

(52) U.S. Cl.
USPC ........................................................ 345/169

(58) Field of Classification Search ............... 345/166, 345/169; 250/206.1, 559.28; 362/324, 610; 385/5, 6, 7, 8, 57; 463/30; 715/701, 702
See application file for complete search history.

(56) References Cited

U.S. PATENT DOCUMENTS

| | | | |
|---|---|---|---|
| 5,561,278 A | 10/1996 | Rutten | |
| 6,529,676 B2 | 3/2003 | Eggleton et al. | |
| 7,121,709 B2 * | 10/2006 | Shinohara et al. | 362/606 |
| 2001/0033270 A1 | 10/2001 | Osawa et al. | |
| 2006/0037848 A1 | 2/2006 | Kobayashi | |
| 2006/0254894 A1 | 11/2006 | Jung et al. | |

FOREIGN PATENT DOCUMENTS

| | | |
|---|---|---|
| EP | 0899707 A2 | 3/1999 |
| EP | 1006543 A1 | 6/2000 |
| EP | 1724800 A1 | 11/2006 |
| EP | 1724801 A1 | 11/2006 |
| EP | 1830375 A2 | 9/2007 |

OTHER PUBLICATIONS

International Search Report and Written Opinion of the International Searching Authority from PCT Application No. PCT/IB2007/000445, dated Dec. 3, 2007, 12 pages.

\* cited by examiner

*Primary Examiner* — Abbas Abdulselam
(74) *Attorney, Agent, or Firm* — Nokia Corporation (57) ABSTRACT

The specification and drawings present a new apparatus and manufacturing method for optical protrusions (e.g., dome pins or actuators) attached to a light guide for providing backlight, actuation function and/or tactile feedback in keypad modules of electronic devices. Spatially and spectrally selective out-coupling of light from the light guide (e.g., a planar light guide plate) can be accomplished using these optical actuators integrated with the light guide for keypad illumination to control out-coupling efficiency and/or spectra of the out-coupled light to enable modification of the visual appearance (intensity, colored/white) of individual keys of the keypad.

20 Claims, 5 Drawing Sheets

OPTICAL ACTUATORS IN KEYPADS

RELATED APPLICATION

This application was originally filed as PCT Application No. PCT/IB2007/000445 filed on Feb. 23, 2007.

TECHNICAL FIELD

The present invention relates generally to electronic devices comprising and, more specifically, to optical actuators (e.g., dome pins) with light guides in keypads of the electronic devices.

BACKGROUND ART

Overall implementation of a keypad for a mobile device, i.e., the final package, including domes, backlight and keyset, should provide the required visual functionality as well as sufficient tactile feedback for the user when pressing an individual key. In view of thin keypads, the tactile feedback can be obtained using elastic light guide, dome pin lead throughs (holes above domes), or dome pins integrated with a plastic light guide (flexible but not elastic). Of these, sufficient optical quality can be obtained using either the first or the last approach.

Spatially selective out-coupling of light from a planar light guide plate for keypad illumination is an important desired feature. It means that simultaneous control of out-coupling efficiency and spectra of the out-coupled light needs to be provided to enable modification of the visual appearance (intensity, colored/white) of the individual keys. In addition, a tactile feedback when pressing an individual key should not be compromised by the illumination system.

Various types of out-coupling means based on surface structuring of the planar light guide exist. Spatial modulation of the out-coupling can be obtained by limiting/modulating the spatial structuring to/within separate regions (key areas) on the light guide.'

Moreover, colored appearance can be typically obtained using white light out-coupling and 'painted' keysets on a keymat. In cost sensitive applications, such as mobile phones, the utilized 'paints' typically have large variety of optical quality depending on the utilized manufacturer and can cause significant efficiency loss due to poor optical characteristics.

Various difficulties appear in keypad utilizing light guides for illumination and usually requiring several different manufacturing steps in keypad and light guide fabrication. Manufacturing of keypad's dome pins is usually realized by injection molding. The mechanical key function is realized by dome pins through holes in the illumination light guide. This can lead to energy losses in the illumination.

DISCLOSURE OF THE INVENTION

According to a first aspect of the invention, an electronic device, comprises: a light guide having a first surface and a second surface; and one or more protrusions made of an optical material and attached to the first surface, wherein the at least one protrusion out of the one or more protrusions is configured to: couple a portion of light propagating through the light guide out of the second surface if the first surface does not reflect or absorb the light, and perform an actuating function for providing a predetermined command to the electronic device when a predetermined force is applied to the second surface opposite to the at least one protrusion causing a predefined local motion of the light guide with the at least one protrusion.

According further to the first aspect of the invention, the at least one protrusion out of the one or more protrusions may be configured to provide a tactile feedback when the predetermined force is applied.

Further according to the first aspect of the invention, the electronic device may further comprise a dome sheet placed opposite to the first surface with at least one dome lined up with the at least one protrusion such that, when the predetermined force is applied to the second surface, the at least one protrusion is pressed against the at least one dome for providing the predetermined command and the tactile feedback.

Still further according to the first aspect of the invention, the portion of light may be coupled out of the second surface by scattering on dispersed scattering particles comprised in the at least one protrusion.

According yet further to the first aspect of the invention, the at least one protrusion may comprise color absorbing particles to enable selecting a pre-selected wavelength band of the portion of light coupled out of the second surface.

According still further to the first aspect of the invention, the at least one further protrusion out of the one or more protrusions does not comprise scattering particles and may be configured: to prevent coupling of a substantial portion of light propagating through the light guide out of the second surface, to perform a further actuating function for providing a further predetermined command to the electronic device when a further predetermined force is applied to the second surface opposite to the at least one further protrusion causing a further predefined local motion of the light guide with the at least one further protrusion, and to provide a further tactile feedback when the further predetermined force is applied.

According further still to the first aspect of the invention, the first surface may comprise an optical layer configured to prevent the light propagating through the light guide from entering the at least one protrusion for preventing the portion of light from coupling out of the second surface. Still further, the optical layer may have an index of refraction substantially lower than the light guide.

According yet further still to the first aspect of the invention, each of the one or more protrusions may be formed by dispensing a droplet of an ultraviolet light curable material on the first surface with subsequent hardening by exposing to an ultraviolet light.

Yet still further according to the first aspect of the invention, each of the one or more protrusions may be formed by dispensing a droplet of a thermally curable material on the first surface with subsequent hardening using a thermal treatment.

Still yet further according to the first aspect of the invention, each of the one or more protrusions may be formed by dispensing a droplet of a reaction curable material comprising a polymer primer and a hardening agent on the on the first surface with subsequent reaction hardening.

Still further still according to the first aspect of the invention, each of the one or more protrusions may be formed by a mold, wherein after the mold is filled with a curable material and pressed against the first surface, the curable material is subsequently hardened using ultraviolet light curing, thermal treatment or a reaction hardening.

Yet further still according to the first aspect of the invention the at least one light guide may be a substantially planar waveguide. Still further, the one or more droplets may have an index of refraction substantially lower than the light guide.

According yet further still to the first aspect of the invention, the electronic device may further comprise a dome sheet placed opposite to the first surface with at least one dome lined up with and attached by adhesion to the at least one protrusion such that, when the predetermined force is applied to the second surface, the at least one protrusion is pressed against the at least one dome for providing the predetermined command and for providing the tactile feedback uniformly.

According to a second aspect of the invention, a method for manufacturing a keypad, comprises: disposing one or more droplets made of an optical material on a first surface of a light guide having the first surface and a second surface; and hardening the droplets using a cure process to permanently attach the droplets to the light guide and form one or more protrusions, wherein at least one protrusion out of the one or more protrusions is configured to: couple a portion of light propagating through the light guide out of the second surface if the first surface does not absorb or reflect the light, and perform an actuating function for providing a predetermined command to an electronic device when a predetermined force is applied to the second surface opposite to the at least one protrusion causing a predefined local motion of the light guide with the at least one protrusion.

According further to the second aspect of the invention, the at least one light guide may be a substantially planar waveguide. Still further, the keyboard may be a part of an electronic device.

Further according to the second aspect of the invention, the at least one protrusion out of the one or more protrusions may be configured to provide a tactile feedback when the predetermined force is applied.

Still further according to the second aspect of the invention, a dome sheet may be placed opposite to the first surface with at least one dome lined up with the at least one protrusion such that, when the predetermined force is applied to the second surface, the at least one protrusion is pressed against the at least one dome for providing the predetermined command and the tactile feedback.

According yet further to the second aspect of the invention, before the disposing, the method may comprise: dispersing the scattering particles in a liquid used for the disposing of the one or more droplets, such that the portion of light is coupled out of the second surface by scattering on the scattering particles comprised in the one or more protrusions.

According still further to the second aspect of the invention, before the disposing, the method may comprise: dispersing color absorbing particles in a liquid used for the disposing of the one or more droplets, such that the at least one protrusion is configured to select a pre-selected wavelength band of the portion of light coupled out of the second surface using the color absorbing particles.

According further still to the second aspect of the invention, the at least one further protrusion out of the one or more protrusions does not comprise scattering particles and may be configured: to prevent coupling of a substantial portion of light propagating through the light guide out of the second surface, to perform a further actuating function for providing a further predetermined command to the electronic device when a further predetermined force is applied to the second surface opposite to the at least one further protrusion causing a further predefined local motion of the light guide with the at least one further protrusion, and to provide a further tactile feedback when the further predetermined force is applied.

According yet further still to the second aspect of the invention, before the disposing the one or more droplets, the method may comprise: disposing on the first surface an optical layer configured to prevent the light propagating through the light guide from entering the at least one protrusion for preventing the portion of light from coupling out of the second surface. Still further, the optical layer may have an index of refraction substantially lower than the light guide.

Yet still further according to the second aspect of the invention, the one or more droplets may be made of ultraviolet curable material and the hardening is performed by exposing to an ultraviolet light. Alternatively, the one or more droplets may be made of thermally curable material and the hardening is performed by thermal treatment. Still further, the one or more droplets may be made of reaction curable material comprising a polymer primer and a hardening agent, and the hardening is performed by a reaction treatment.

Still yet further according to the second aspect of the invention, the one or more droplet may be formed by a mold process, wherein after the mold is filled with a curable material and pressed against the first surface for the disposing, the hardening is performed using ultraviolet light curing, a thermal treatment or a reaction hardening.

Still further still according to the second aspect of the invention, the method may further comprise: lining up the first surface with one or more protrusions after the hardening against a dome sheet with domes of the dome sheet lined up with corresponding protrusions such that at least one dome of the domes is lined up with the at least one protrusion; pressing the first surface with the one or more protrusions against the dome sheet; and further hardening the one or more protrusions by the cure process to permanently attach by adhesion the domes of the dome sheet to the corresponding protrusions, such that when the predetermined force is applied to the second surface, the at least one protrusion is pressed against the at least one dome for providing the predetermined command and for providing the tactile feedback uniformly.

According to a third aspect of the invention, a keypad, comprises: a light guide having a first surface and a second surface; and one or more protrusions made of an optical material and attached to the first surface, wherein at least one protrusion out of the one or more protrusions is configured to: couple a portion of light propagating through the light guide out of the second surface if the first surface does not reflect or absorb the light, and perform an actuating function for providing a predetermined command to the electronic device when a predetermined force is applied to the second surface opposite to the at least one protrusion causing a predefined local motion of the light guide with the at least one protrusion. Still further, the at least one protrusion out of the one or more protrusions may be configured to provide a tactile feedback when the predetermined force is applied.

According to a fourth aspect of the invention, an optical module comprises: a light guide having a first surface and a second surface; and one or more protrusions made of an optical material and attached to the first surface, wherein at least one protrusion out of the one or more protrusions is configured to couple a portion of light propagating through the light guide out of the second surface by scattering on dispersed scattering particles comprised in the at least one protrusion.

BRIEF DESCRIPTION OF THE DRAWINGS

For a better understanding of the nature and objects of the present invention, reference is made to the following detailed description taken in conjunction with the following drawings, in which.

MODES FOR CARRYING OUT THE INVENTION

A new apparatus and method for manufacturing are provided for optical protrusions (e.g., dome pins or actuators) attached to a light guide (e.g., a substantially planar light guide) for providing backlight, actuation function and/or tactile feedback in keypad modules of electronic devices. Spatially and spectrally selective out-coupling of light from the light guide (e.g., a planar light guide plate) can be accomplished using these optical actuators integrated with the light guide for keypad illumination to control out-coupling efficiency and/or spectra of the out-coupled light to enable modification of the visual appearance (intensity, colored/white) of individual keys of the keypad. Also, the tactile feedback, when pressing an individual key, must not be compromised by the illumination system, described herein, and can be provided using these optical protrusions/actuators.

According to an embodiment of the present invention, in a keypad module, one or more protrusions (e.g., dome pins) made of an optical material can be attached to a first surface of a substantially planar light guide (e.g., thin planar light guide plate) having the first surface and a second surface, wherein at least one protrusion out of the one or more protrusions can be configured: to couple a portion of light propagating through the substantially planar light guide out of the second surface (e.g., for illumination of keypad graphics) if the first surface does not reflect or absorb the light, and/or to perform an actuating function for providing a predetermined command to an electronic device comprising this keypad module when a predetermined force (e.g., pressing a corresponding key on a keymat) is applied to the second surface opposite to the at least one protrusion causing a predefined local motion of the light guide with the at least one protrusion (without causing a substantial tensile deformation of the light guide). Also, this at least one protrusion can be configured to provide a tactile feedback to a user when this predetermined force is applied.

Furthermore, the keypad module can comprise a dome sheet placed opposite to the first surface of the light guide with at least one dome lined up with the at least one protrusion such that, when the predetermined force (i.e., pressing the key) is applied to the second surface, the at least one protrusion is pressed against the at least one dome for providing said predetermined command and said tactile feedback.

In one embodiment, light out-coupling from the second surface of the light guide (e.g. for identifying a corresponding key on a keymat) can be obtained, by dispersing light scattering particles (nanometer to micron dimensions) in the protrusions (e.g., dome pins) using UV (ultraviolet) curable liquid. After droplet injection and UV curing, as described herein, the dome pins will have light diffusing character, thus providing the means for the light out-coupling from the second surface of the light guide. Furthermore, if the scattering particles are selected to have optical absorption within a preselected wavelength band, coloured illumination can also be implemented.

According to an embodiment of the present invention, diffusing character of the dome pins (protrusions) can be provided by mixing light scattering particles, e.g., with the UV curable liquid prior to droplet injection. The amount of the out-coupled light can be controlled by the concentration of the scattering particles. In another embodiment, concentration of the scattering particles may be increased as a function of distance of the dome pin from the light source for the light guide to obtain more uniform illumination of the keys. Moreover, a spectral character of the out-coupled light can be controlled by doping the dome pins with a suitable dye (color absorbing particles) to absorb the unwanted wavelengths. Scattering particles, e.g., can be small color particles used in normal paints and printing dyes, metal particles, oxides like $TiO_2$ or $AlO_2$, etc.

There are many possible variations. According to one embodiment, the keypad module can comprise at least one further undoped protrusion (scattering particles are not injected) out of the one or more protrusions in addition to the at least one (doped) protrusion described above, such that this at least one further protrusion is configured not to couple a substantial portion of light propagating through the light guide out of the second surface of the light guide, while providing the same actuating and tactile functions as the at least one (doped) protrusion. Still further, the first surface of the light guide may have an optical layer (e.g., an optical coating having an index of refraction substantially lower than the index of the light guide, thus causing a total internal reflection) configured to prevent the light propagating through the light guide from entering the protrusion attached to this first surface, thus preventing light out-coupling from the second surface of the light guide. Alternatively, the optical material (e.g., curable liquid used for manufacturing) of the protrusions can be also chosen to have an index of refraction substantially lower than the index of refraction of the light guide to prevent the light propagating through the light guide from entering the protrusion (due to a total internal reflection on the light guide boundary), so the additional optical layer, described herein, may not be necessary on the first surface of the light guide.

Manufacturing methods of optical dome pins (optical actuators), described herein, can include but are not limited to: UV (ultraviolet) curing methods, thermal curing methods, reactive curing methods, etc. According to an embodiment of the present invention, dome pins on a thin light guide (light guide) can be manufactured by droplet injection with subsequent hardening using UV light curing. The light guide can be made of a plastic material, e.g., relatively hard material such as PMMA (polymethylmethacrylate).

A UV curable polymer can be injected on the light guide surface by an accurate injection dispenser when the volume of the droplet can be controlled by an injection volume and a size of the dispense needle. The location of droplets can be defined accurately by robotics and therefore the design can be very flexible for possible changes. The dimensions of the manufactured droplet dome pins can depend on, e.g., light guide material, dispensed droplet volume, droplet material features and surface chemistry between light guide and droplet materials. After the injection, the UV-material is exposed to a short pulse of a strong ultraviolet light after which the material is cured (hardened) and the dome pin is fabricated. These droplet dome pins can generate less optical loss and shadowing effects in the light guide than the conventional hole-lead-in solution. Furthermore, by the choice of the droplet material (for example index of refraction), the effect of a material interface can be adjusted as well as optical effects can be modified (e.g., a fluorescence material could amplify the wanted color).

Dome pins can also be fabricated by UV-molding using a mold, wherein similar dome pins like droplets are manufactured using a negative structure. The mold can be filled by the UV-curable material and pressed against the light guide. The UV-curable material then can be hardened (cured) by a strong UV-light after which the mold is separated from the replicated dome pins. It follows that the dome pins can be replicated with a very thin layer of the UV-curable material on the light guide. This allows manufacturing of dome pins with the designed surface profile for operating these dome pins as out-coupling components in the light guide, as described herein. Molding can also improve adhesion between the light guide and the droplet because of the large molding area contact.

According to another embodiment, the dome pins (optical actuators) can be formed (manufactured) by dispensing a droplet of a thermally curable material on the surface of the light guide with subsequent hardening using a thermal treatment. Moreover, the dome pins (optical actuators) can be formed by dispensing a droplet of a reaction curable material comprising, e.g., a polymer primer and a hardening agent on the surface of the light guide with subsequent reaction hardening. Furthermore, the dome pins (optical actuators) can be formed by a molding technique, wherein after the mold is filled with a curable material and pressed against said first surface, the curable material can be subsequently hardened using ultraviolet light curing (for the UV curable droplet material, as described above in detail), using thermal treatment (for the thermally curable material) or a reaction hardening (for the reaction curable material).

Furthermore, according to a further embodiment, the dome pins (protrusions) can be permanently attached to the dome pins for providing better permanent alignment of dome pins against domes and more uniform tactile feedback. According to this embodiment, after the first hardening (or pre-hardening) of dome pins (protrusions) on the first surface of the light guide, the first surface with attached one or more protrusions is accurately lined up against domes of a dome sheet (i.e., lining up protrusions with corresponding domes), and then pressed against the dame sheet with subsequent second (further) hardening of the dome pins (protrusions) by the cure process to permanently attach by adhesion the domes of the dome sheet to the corresponding protrusions.

Thus, manufacturing methods described herein enable the dome pin fabrication directly on the light guide and therefore will reduce harmful energy losses in the push button function lead-in compared with conventional technologies. The manufacturing methods described herein can be used with very thin light guides and automated by robotics in a reliable way in a single manufacturing process utilizing standard (inexpensive) plastics for light guides which should reduce the total manufacturing costs.

Moreover, visual characteristics of individual keys to be controlled by the backlight, rather than by a third party manufactured keyset, can be advantageous. Traditionally keysets have huge variability in the visual appearance and optical efficiency, which is much more controllable in the light guide approach with optical actuators, as described herein. Also, use of fairly hard materials (PMMA) for the light guide with the dome pins (optical actuators) can provide a strong tactile feedback to the user. In contrast, use of an elastomer based light guide typically can lead to reduction of the tactile sensation. Thus, the dome pin based solution can allow to use thinner key domes resulting in a more compact (thinner) keypad solutions as compared with elastomer based solutions.

The possible materials for protrusions can be (but is not limited to): optical adhesives like NOA61, SK9, UV curable epoxies, sealing materials, silicone materials, etc. For reactive and thermal curing two component epoxies can be used.

Figure 1A:
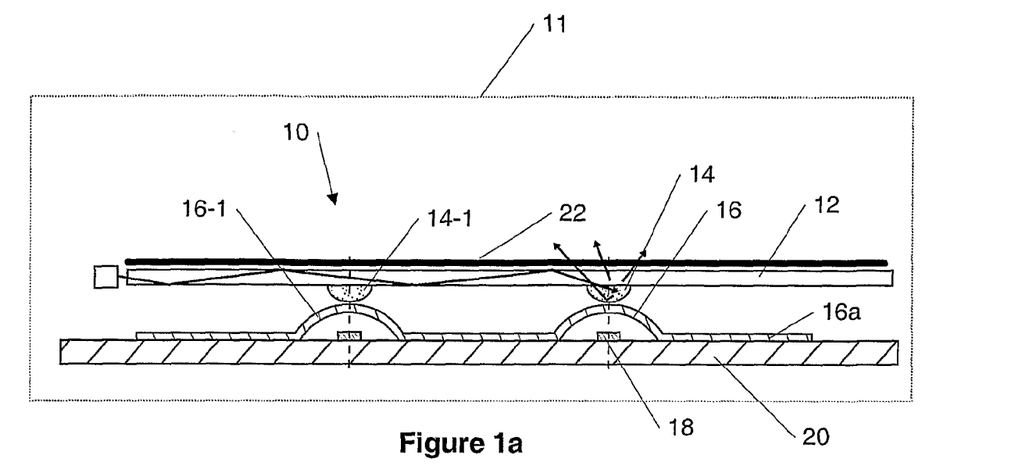
FIGS. 1a and 1b are schematic representations of an electronic device comprising a keypad module with optical actuators (protrusions or dome pins) attached to a planar light guide with all keys in "off" position (FIG. 1a) and with one key in "on" position (FIG. 1b), according to embodiments of the present invention.
Figure 1B:
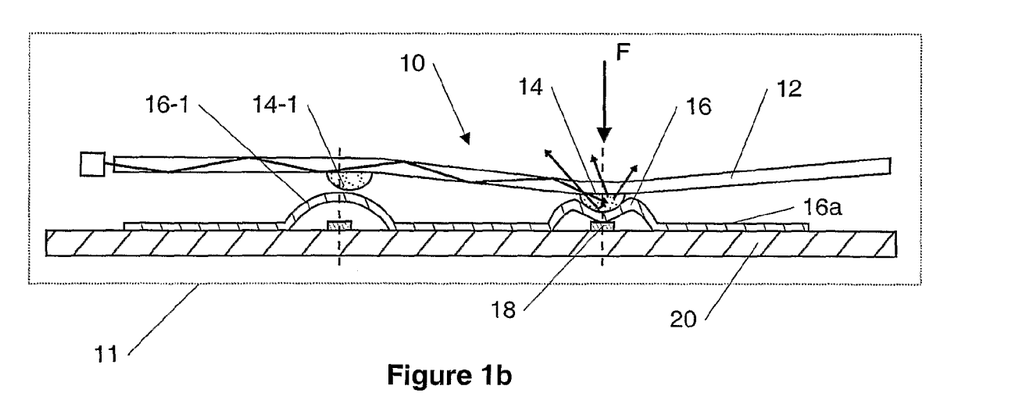

FIGS. 1a and 1b show examples among others of schematic representations of an electronic device 11 comprising a keypad module 10 with optical actuators (protrusions or dome pins) 14 and 14-1, doped with scattering particles and attached to a substantially planar light guide 12 with all keys on a keymat 22 in "off" position (FIG. 1a) and with one key in "on" position (FIG. 1b), according to embodiments of the present invention. The keymat 22 is only shown in FIG. 1a. Doped dome pins 14 and 14-1 with light guide 12 provide a backlight illumination of the corresponding keys of the keymat 22, according to various embodiments of the present invention as described herein. It is noted that the light guide 12 can generally be means for light propagating or a structural equivalence (or an equivalent structure) thereof. Similarly, the protrusion 14 or 14-1 can generally be means for actuating or a structural equivalence (or equivalent structure) thereof.

The light guide 12 is attached to the dome sheet 16a only at some locations at the edges (not shown), which means that the tensile strain due to a key press is distributed over the whole light guide 12, i.e., the light guide 12 mainly flexes with a a little stretching. If the light guide 12 would be attached to the dome sheet 16a using elastomer as a glue (as in a conventional approach), the light guide 12 would only flex while the elastomer would take the tensile strain.

Figure 2:
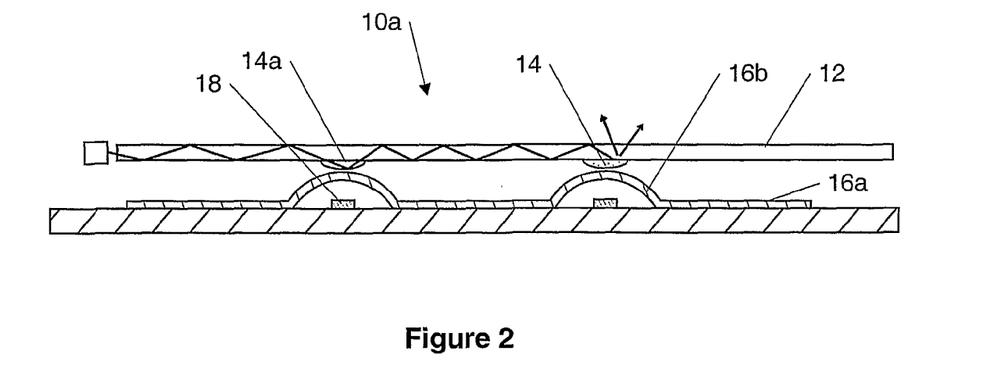
FIG. 2 is a schematic representation of a keypad module with doped and undoped dome pins (optical actuators or protrusions) attached to a planar light guide with all keys in "off" position, according to an embodiment of the present invention.

When a predetermined force F (e.g., pressing a corresponding key on the keymat 22) is applied to the key located on the opposite side of the light guide 12 to the dome pin 14 as shown in FIG. 1b, this will cause a predefined local motion of the light guide 12 with the dome pin 14 towards a dome 16 which is deformed to make a physical (electrical) contact with a contact member 18 of a switch board 20 for providing a predetermined command to the electronic device 11. It is seen from FIG. 2b that a dome pin 14-1 is only slightly moved without causing a required deformation of the dome 16-1 for making a physical (electrical) contact with the corresponding contact member of the dome 16-1.

FIG. 2 shows another example among others of a schematic representation of a keypad module 10 with doped and undoped dome pins (optical actuators or protrusions) 14 and 14a, respectively, attached to a planar light guide 12 with all keys in "off" position, according to another embodiment of the present invention. The difference with the arrangement of FIGS. 1a and 1b is that FIG. 2 demonstrates the use of clear (undoped) dome pins along with doped pins to obtain contact actuation without light out-coupling for selected keys. Such pins may be needed since, sometimes, not all keys need to be illuminated.

Figure 3:
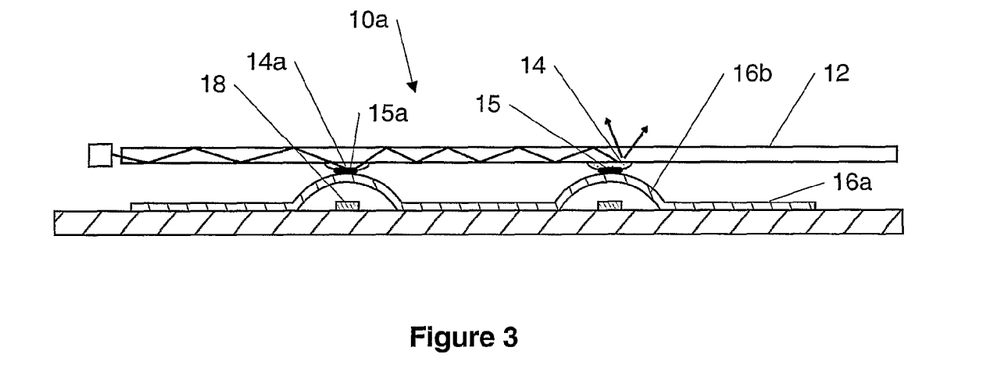
FIG. 3 is a schematic representation of a keypad module with doped and undoped dome pins (optical actuators or protrusions) attached to a planar light guide and to corresponding domes of a dome sheet with all keys in "off" position, according to an embodiment of the present invention.

FIG. 3 shows another example among others of a schematic representation of a keypad module 10 with doped and undoped dome pins (optical actuators or protrusions) 14 and 14a, respectively, attached to a planar light guide 12 and to corresponding domes of the dome sheet 16a with all keys in "off" position, according to another embodiment of the present invention. In this embodiment the hardening has two steps as described herein, such that dome pins 14 and 14b are attached using adhesion layers 15 and 15a formed during the second hardening step (see details in FIG. 7), respectively, to the corresponding domes. This provides better permanent alignment of dome pins against domes and more uniform tactile feedback.

Figure 4:
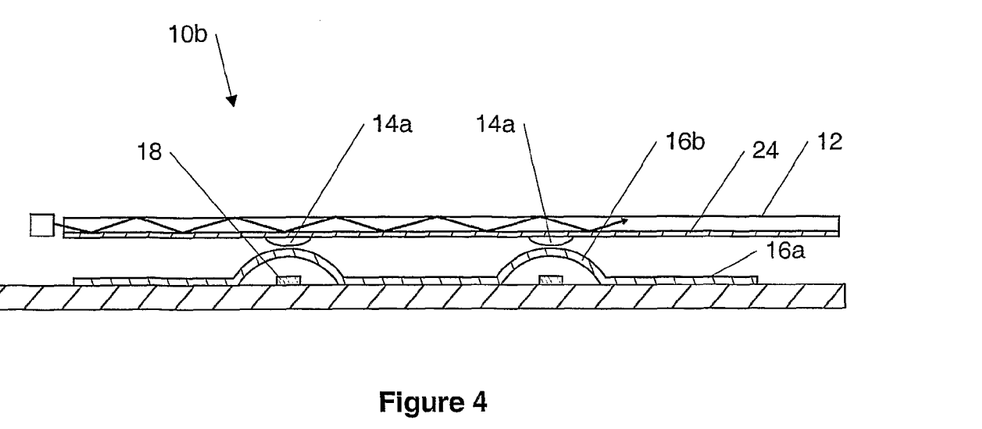
FIG. 4 is a schematic representation of a keypad module with undoped dome pins (optical actuators or protrusions) attached to a planar light guide using an optical isolation film with all keys in "off" position, according to an embodiment of the present invention.

FIG. 4 shows still further example among others of a schematic representation of a keypad module 10 with undoped dome pins 14a attached to the light guide 12 using an optical isolation film 24 with all keys in "off" position, according to a further embodiment of the present invention. The difference with the arrangement of FIGS. 1a and 1b is that FIG. 4 demonstrates using an additional optical isolation film 24 on the surface of the light guide 12 (facing the dome sheet 16a) to prevent light from entering the dome pins 14a. Such implementation might be needed in applications where light out-coupling due to dome pins is not desirable (e.g., for changing graphics keypads).

Figure 5:
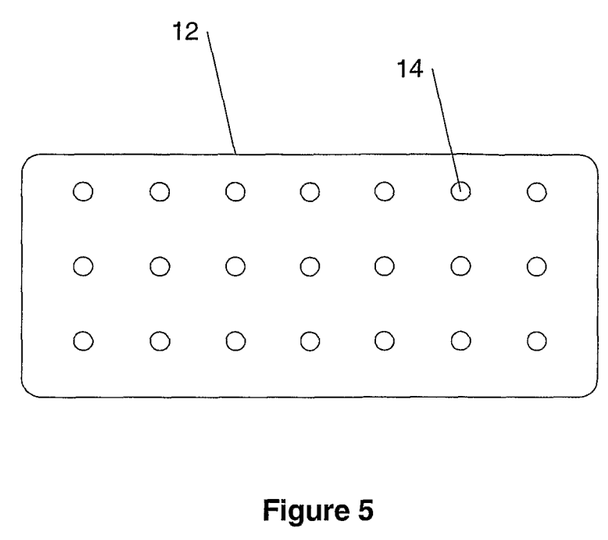
FIG. 5 is a top view of a light guide with dome pins (optical actuators or protrusions), according to an embodiment of the present invention.

FIG. 5 shows an example among others of a light guide 12 (top view) with dome pins (optical actuators or protrusions) 14, manufactured according to the embodiments of the present invention, as described herein. It is noted that doping of dome pins 14 (i.e., concentration of the scattering particles) may be increased as a function of distance of a dome pin from the light source for the light guide 12 for providing more uniform illumination of corresponding keys.

Figure 6:
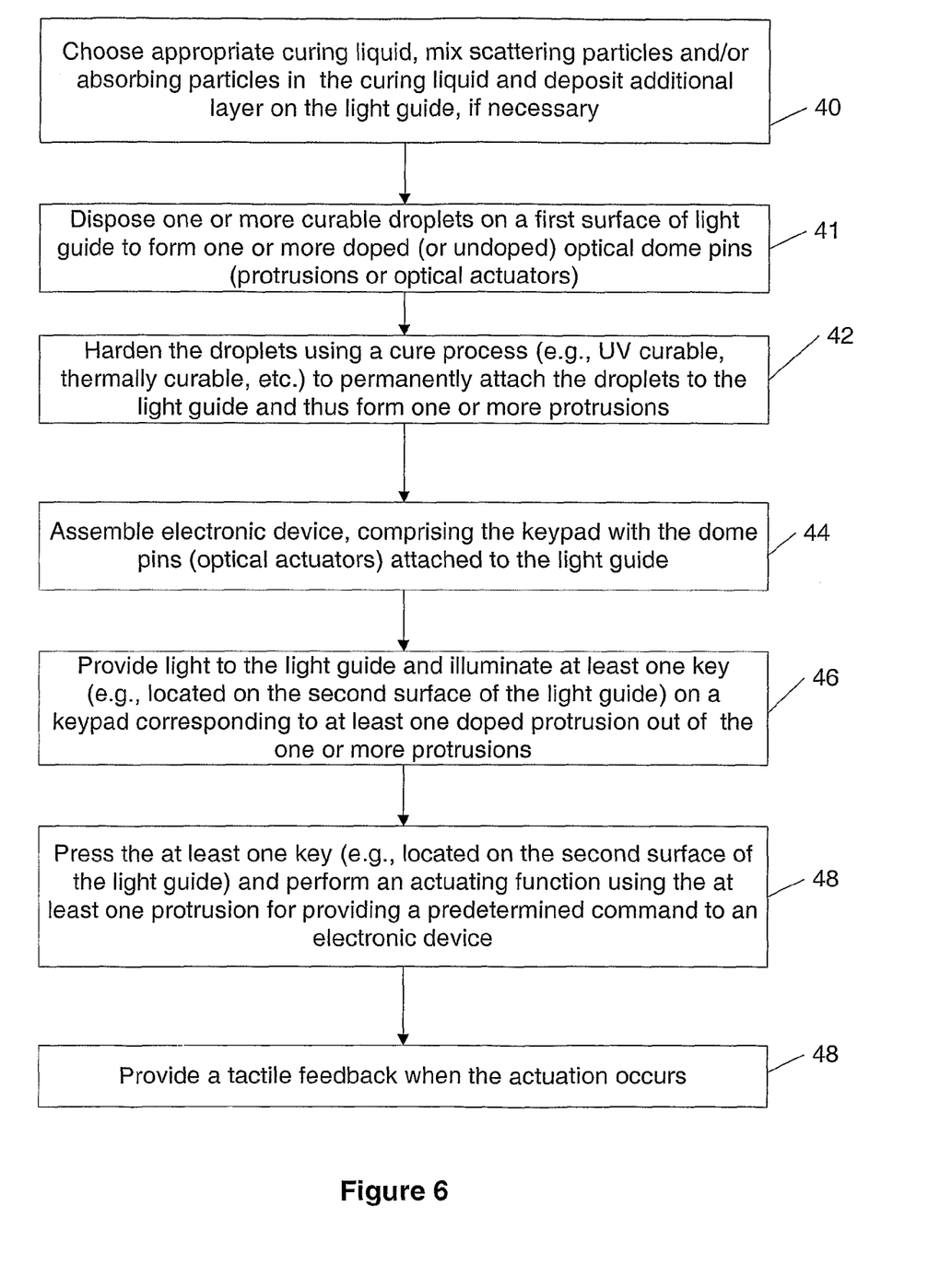
FIG. 6 is a flow chart demonstrating manufacturing and usage process of a keypad with dome pins (optical actuators or protrusions) attached to a light guide, according to an embodiment of the present invention.

FIG. 6 shows an example of a flow chart demonstrating manufacturing and usage process of a keypad with dome pins (optical actuators or protrusions) attached to a light guide, according to embodiments of the present invention.

The flow chart of FIG. 6 only represents one possible scenario among others. It is noted that the order of steps shown in FIG. 6 is not absolutely required, so in principle, the various steps can be performed out of order. In a method according to the embodiment of the present invention, in a first (preliminary) step 40, an appropriate curing liquid is chosen, scattering particles and/or absorbing particles are mixed in the curing liquid and, if necessary, an additional layer (e.g., with low index of refraction) is deposited on the light guide.

In a next step 41, one or more curable droplets are disposed on a first surface of a light guide (e.g., a planar thin light guide plastic plate) to form one or more doped (or undoped) optical dome pins (protrusions or optical actuators), according to various embodiments of the present invention described herein. In a next step 42, the droplets are hardened using a cure process (e.g., UV curable, thermally curable, etc.) to permanently attach the droplets to the light guide and thus forming the one or more protrusions, according to various embodiments of the present invention described herein. In a next step 44, an electronic device, comprising a keypad with the dome pins (optical actuators) attached to the light guide, is assembled.

In a next step 46, light from a light source is provided to the light guide and at least one key (e.g., located on the second surface of the light guide) on a keypad corresponding to at least one doped protrusion out of the one or more protrusions, is illuminated. In a next step 48, the at least one key (e.g., located on the second surface of the light guide) is pressed causing actuation using the at least one protrusion for providing a predetermined command to an electronic device comprising this keypad. In a next step 50, a tactile feedback is provided to the user when the actuation occurs.

Figure 7:
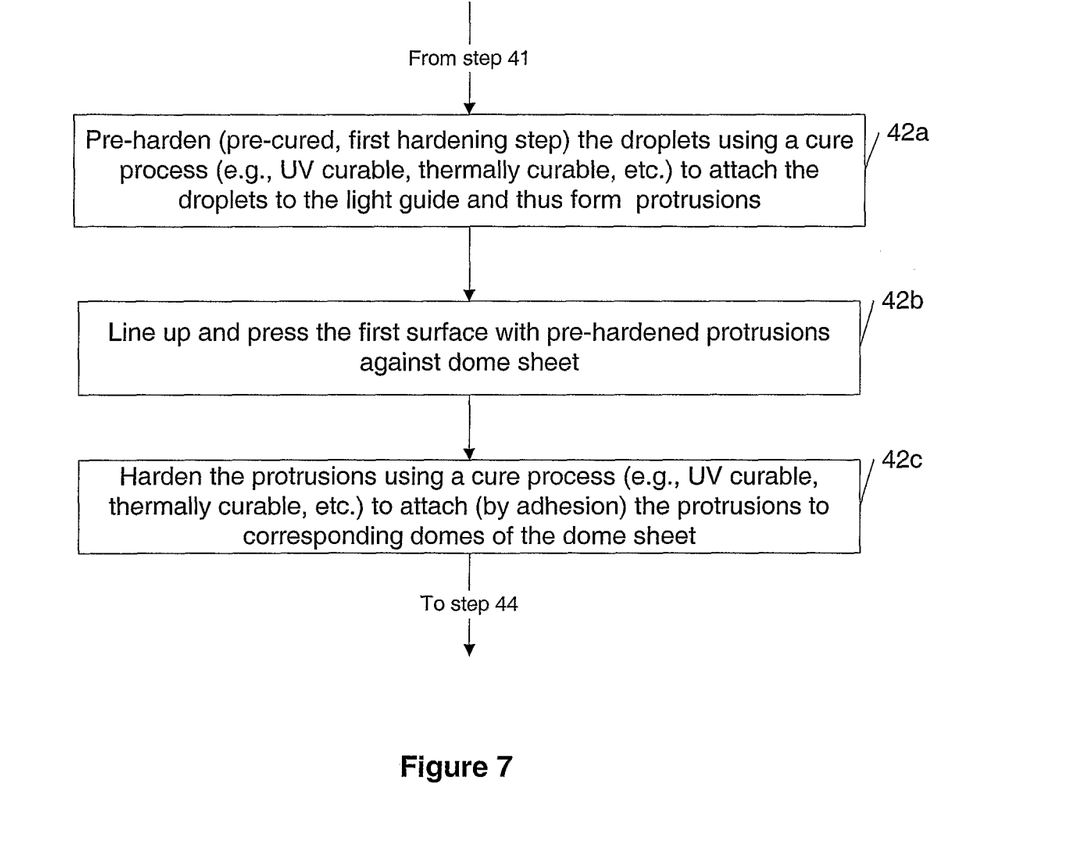
FIG. 7 is a flow chart demonstrating manufacturing and usage process of a keypad with dome pins (optical actuators or protrusions) attached to a light guide and to corresponding domes of a dome sheet, according to an embodiment of the present invention.

FIG. 7 shows another example of a flow chart demonstrating manufacturing and usage process of a keypad with dome pins (optical actuators or protrusions) attached to a light guide and to corresponding domes of a dome sheet, according to embodiments of the present invention.

The flow chart of FIG. 7 only represents one possible scenario among others. It is noted that the order of steps shown in FIG. 7 is not absolutely required, so in principle, the various steps can be performed out of order. The process shown in FIG. 7 differs from the process of FIG. 6 only in step 42: several steps are introduced instead of step 42. In a method according to the embodiment of the present invention, after step 41, in a next step 42a (which is equivalent to step 42 of FIG. 6), the droplets are hardened (or prehardened) using a cure process (e.g., UV curable, thermally curable, etc.) to attach the droplets to the light guide and thus form protrusions. In a next step 42b, the first surface with pre-hardened protrusions is lined up (such that protrusions are lined up against corresponding domes) and pressed against the dome sheet. In a next step 42c, the protrusions are hardened again using the cure process (e.g., UV curable, thermally curable, etc.) to permanently attach (by adhesion) the protrusions to corresponding domes of the dome sheet.

Furthermore, according to a further embodiment, the dome pins (protrusions) can be permanently attached to the dome pins for providing better permanent alignment of dome pins against domes and more uniform tactile feedback. In this embodiment, after the first hardening (or pre-hardening) of dome pins (protrusions) on the first surface of the light guide, the first surface with attached one or more protrusions is accurately lined up against domes of a dome sheet (i.e., lining up protrusions with corresponding domes), and then pressed against the dome sheet with subsequent second (further) hardening of the dome pins (protrusions) by the cure process to permanently attach by adhesion the domes of the dome sheet to the corresponding protrusions It is noted that various embodiments of the present invention recited herein can be used separately, combined or selectively combined for specific applications.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. An electronic device, comprising:
  a light guide having a first surface and a second surface; and
  one or more protrusions made of an optical material and attached to said first surface,
  wherein at least one protrusion out of said one or more protrusions is configured to:
  couple a portion of light propagating through said light guide out of said second surface if said first surface does not reflect or absorb said light, and perform an actuating function for providing a predetermined command to the electronic device when a predetermined force is applied to said second surface opposite to said at least one protrusion causing a predefined local motion of said light guide with said at least one protrusion.

2. The electronic device according to claim 1, wherein said at least one protrusion out of said one or more protrusions is configured to provide a tactile feedback when said predetermined force is applied.

3. The electronic device according to claim 1, further comprising a dome sheet placed opposite to said first surface with at least one dome lined up with said at least one protrusion such that, when said predetermined force is applied to said second surface, said at least one protrusion is pressed against said at least one dome for providing said predetermined command and said tactile feedback.

4. The electronic device according to claim 1, wherein said portion of light is coupled out of said second surface by scattering on dispersed scattering particles comprised in said at least one protrusion.

5. The electronic device according to claim 1, wherein said at least one protrusion comprises color absorbing particles to enable selecting a pre-selected wavelength band of said portion of light coupled out of said second surface.

6. The electronic device according to claim 1, wherein the at least one further protrusion out of said one or more protrusions does not comprise scattering particles and is configured:
to prevent coupling of a substantial portion of light propagating through said light guide out of said second surface,
to perform a further actuating function for providing a further predetermined command to the electronic device when a further predetermined force is applied to said second surface opposite to said at least one further protrusion causing a further predefined local motion of said light guide with said at least one further protrusion, and
to provide a further tactile feedback when said further predetermined force is applied.

7. The electronic device according to claim 1, wherein said first surface comprises an optical layer configured to prevent said light propagating through said light guide from entering said at least one protrusion for preventing said portion of light from coupling out of said second surface.

8. The electronic device according to claim 7, wherein said optical layer has an index of refraction substantially lower than said light guide.

9. The electronic device according to claim 1, wherein each of said one or more protrusions is formed by at least one of:
dispensing a droplet of an ultraviolet light curable material on said first surface with subsequent hardening by exposing to an ultraviolet light, dispensing a droplet of a thermally curable material on said first surface with subsequent hardening using a thermal treatment and dispensing a droplet of a reaction curable material comprising a polymer primer and a hardening agent on said on said first surface with subsequent reaction hardening.

10. The electronic device according to claim 1, wherein each of said one or more protrusions is formed by a mold, wherein after said mold is filled with a curable material and pressed against said first surface, said curable material is subsequently hardened using ultraviolet light curing, thermal treatment or a reaction hardening.

11. The electronic device according to claim 1, wherein said one or more protrusions are made of an ultraviolet-curable liquid which is hardened by exposing to an ultraviolet light.

12. The electronic device according to claim 1, wherein said at least one light guide is a substantially planar waveguide.

13. The electronic device according to claim 1, wherein said one or more droplets have an index of refraction substantially lower than said light guide.

14. The electronic device according to claim 1, further comprising a dome sheet placed opposite to said first surface with at least one dome lined up with and attached by adhesion to said at least one protrusion such that, when said predetermined force is applied to said second surface, said at least one protrusion is pressed against said at least one dome for providing said predetermined command and for providing said tactile feedback uniformly.

15. A method for manufacturing a keypad, comprising:
disposing one or more droplets made of an optical material on a first surface of a light guide having said first surface and a second surface; and
hardening said droplets using a cure process to permanently attach the droplets to the light guide and form one or more protrusions,
wherein at least one protrusion out of said one or more protrusions is configured to:
couple a portion of light propagating through said light guide out of said second surface if said first surface does not absorb or reflect said light, and
perform an actuating function for providing a predetermined command to an electronic device when a predetermined force is applied to said second surface opposite to said at least one protrusion causing a predefined local motion of said light guide with said at least one protrusion.

16. The method according to claim 15, wherein the at least one further protrusion out of said one or more protrusions does not comprise scattering particles and is configured:
to prevent coupling of a substantial portion of light propagating through said light guide out of said second surface,
to perform a further actuating function for providing a further predetermined command to the electronic device when a further predetermined force is applied to said second surface opposite to said at least one further protrusion causing a further predefined local motion of said light guide with said at least one further protrusion, and
to provide a further tactile feedback when said further predetermined force is applied.

17. The method according to claim 15, wherein before said disposing said one or more droplets, the method comprises: disposing on said first surface an optical layer configured to prevent said light propagating through said light guide from entering said at least one protrusion for preventing said portion of light from coupling out of said second surface.

18. The method according to claim 15, further comprises:
lining up the first surface with one or more protrusions after said hardening against a dome sheet with domes of said dome sheet lined up with corresponding protrusions such that at least one dome of said domes is lined up with said at least one protrusion;
pressing the first surface with said one or more protrusions against said dome sheet; and
further hardening said one or more protrusions by said cure process to permanently attach by adhesion said domes of the dome sheet to said corresponding protrusions,
such that when said predetermined force is applied to said second surface, said at least one protrusion is pressed against said at least one dome for providing said predetermined command and for providing said tactile feedback uniformly.

19. A keypad, comprising:

a light guide having a first surface and a second surface; and one or more protrusions made of an optical material and attached to said first surface, wherein at least one protrusion out of said one or more protrusions is configured to:

couple a portion of light propagating through said light guide out of said second surface if said first surface does not reflect or absorb said light, and perform an actuating function for providing a predetermined command to the electronic device when a predetermined force is applied to said second surface opposite to said at least one protrusion causing a predefined local motion of said light guide with said at least one protrusion.

20. The keypad according to claim 19, wherein said at least one protrusion out of said one or more protrusions is configured to provide a tactile feedback when said predetermined force is applied.

* * * * *